United States Patent [19]
Rios

[11] Patent Number: 5,363,086
[45] Date of Patent: Nov. 8, 1994

[54] MOTOR VEHICLE ANTI-THEFT DEVICE

[76] Inventor: Jose L. Rios, 8801 Glen Crest, #6126, Houston, Tex. 77061

[21] Appl. No.: 771,648

[22] Filed: Oct. 4, 1991

[51] Int. Cl.⁵ .............................................. B60R 25/10
[52] U.S. Cl. ................................................... 340/426
[58] Field of Search ............................ 340/425.5, 426; 180/287; 307/10.2; 188/24.18, 265

[56] References Cited

U.S. PATENT DOCUMENTS

| | | | |
|---|---|---|---|
| 1,295,410 | 2/1919 | Zabel | 340/426 |
| 3,552,518 | 1/1971 | Aidner | 180/287 |
| 4,669,570 | 6/1987 | Perret | 180/287 |
| 4,691,801 | 9/1987 | Mann | 307/10.2 |
| 5,078,456 | 1/1992 | Cox | 180/287 |
| 5,086,868 | 2/1992 | Fontaine | 180/287 |

Primary Examiner—Hezron E. Williams
Assistant Examiner—Christine K. Oda
Attorney, Agent, or Firm—Harry C. Post, III

[57] ABSTRACT

An anti-theft system for preventing the theft of a vehicle having brakes used for stopping the vehicle. A brake override is connected to the vehicle for selectively moving the brakes of the vehicle between an engaged and locked position to prevent the vehicle from being moved and a disengaged position to allow the vehicle to be moved. A remote controlled activating apparatus is mounted on the vehicle for activating the brake override means to move the brakes between the engaged and locked position and the disengaged position. A remote controlling device is provided exteriorly of the vehicle for activating the remote controlled activating apparatus to prevent movement of the vehicle when an authorized user so desires and to allow movement of the vehicle when the authorized user so desires.

18 Claims, 4 Drawing Sheets

MOTOR VEHICLE ANTI-THEFT DEVICE

TECHNICAL FIELD

This invention relates to an anti-theft system and; more particularly, to a system for preventing the theft of a vehicle.

BACKGROUND ART

It is well known that the theft of motor vehicles, such as automobiles, trucks, vans, recreational vehicles and similar transportation devices, has developed into a problem of epidemic proportions.

In the past, many devices have been made to prevent the theft of vehicles. A couple of examples of such devices are a mechanical device to lock the steering wheel in place and an alarm system to activate the lights of the vehicle and horn when a triggering event occurs. Some examples of a triggering event are touching the vehicle with a metal object, lifting one end above the other end as when loading the vehicle on a wrecker, and breaking a window.

The alarm systems are normally mounted on the vehicle and have a receiver adapted to receive a signal from a remote control device operated by an authorized user of the vehicle outside the interior of the vehicle. However, these systems do not prevent a wrecker or similar towing vehicle from lifting up the front end of the vehicle and towing the vehicle down the road or street with the lights flashing and the horn blaring.

Accordingly, it is an object of the present invention to provide an anti-theft device of a vehicle having brakes used for stopping the vehicle.

Further, it is an object of the present invention to provide an anti-theft device of a vehicle having brakes used for stopping the vehicle by engaging the brakes to prevent movement of the vehicle until the brakes have been disengaged.

Further, it is an object of the present invention to provide an anti-theft device of a vehicle having brakes used for stopping the vehicle by engaging the brakes to prevent movement of the vehicle and to inactivate a light on the vehicle indicating when the brakes are engaged to prevent the battery on the vehicle from loosing power.

Further, it is an object of the present invention to provide a method of preventing the theft of a vehicle having brakes used in stopping the vehicle by remotely locking the brakes on the vehicle in an engaged position so that the vehicle may not be moved before moving the brakes to a disengaged position.

DISCLOSURE OF THE INVENTION

In accordance with the present invention, there is provided an anti-theft system for preventing the theft of a vehicle having brakes used for stopping the vehicle. The system comprises brake override connected to the vehicle for selectively moving the brakes of the vehicle between an engaged and locked position to prevent the vehicle from being moved and a disengaged position to allow the vehicle to be moved. Remote controlled activating apparatus is mounted on the vehicle for activating the brake override to move the brakes between the engaged and locked position and the disengaged position. A remote controlling device is provided exteriorly of the vehicle for activating the remote controlled activating apparatus to prevent movement of the vehicle when an authorized user so desires and to allow movement of the vehicle when the authorized user so desires.

Further, in accordance with the present invention there is provided a system for preventing the theft of a vehicle having brakes used in stopping the vehicle. The system comprises an alarm apparatus adapted to be mounted on the vehicle for providing an alarm when the vehicle is moved. The alarm apparatus is adapted to be switched between an activated position when the vehicle is not being moved and an inactivated position when the vehicle is moving. Brake override is adapted to be connected to the alarm apparatus to the vehicle for locking the brakes of the vehicle in an engaged position when the alarm apparatus is activated.

Further, in accordance with the present invention there is provided a method of preventing the theft of a vehicle having brakes used in stopping the vehicle. The method comprises the steps of removing a user of the vehicle from an interior of the vehicle. The brakes on the vehicle are then locked in an engaged position from a remotely location so that the vehicle may not be moved.

BRIEF DESCRIPTION OF THE DRAWINGS

Other objects and advantages of the invention will become apparent upon reading the following detailed description and upon reference to the drawings, wherein like reference characters are used throughout to designate like parts.

BEST MODE FOR CARRYING OUT THE INVENTION

Figure 1:
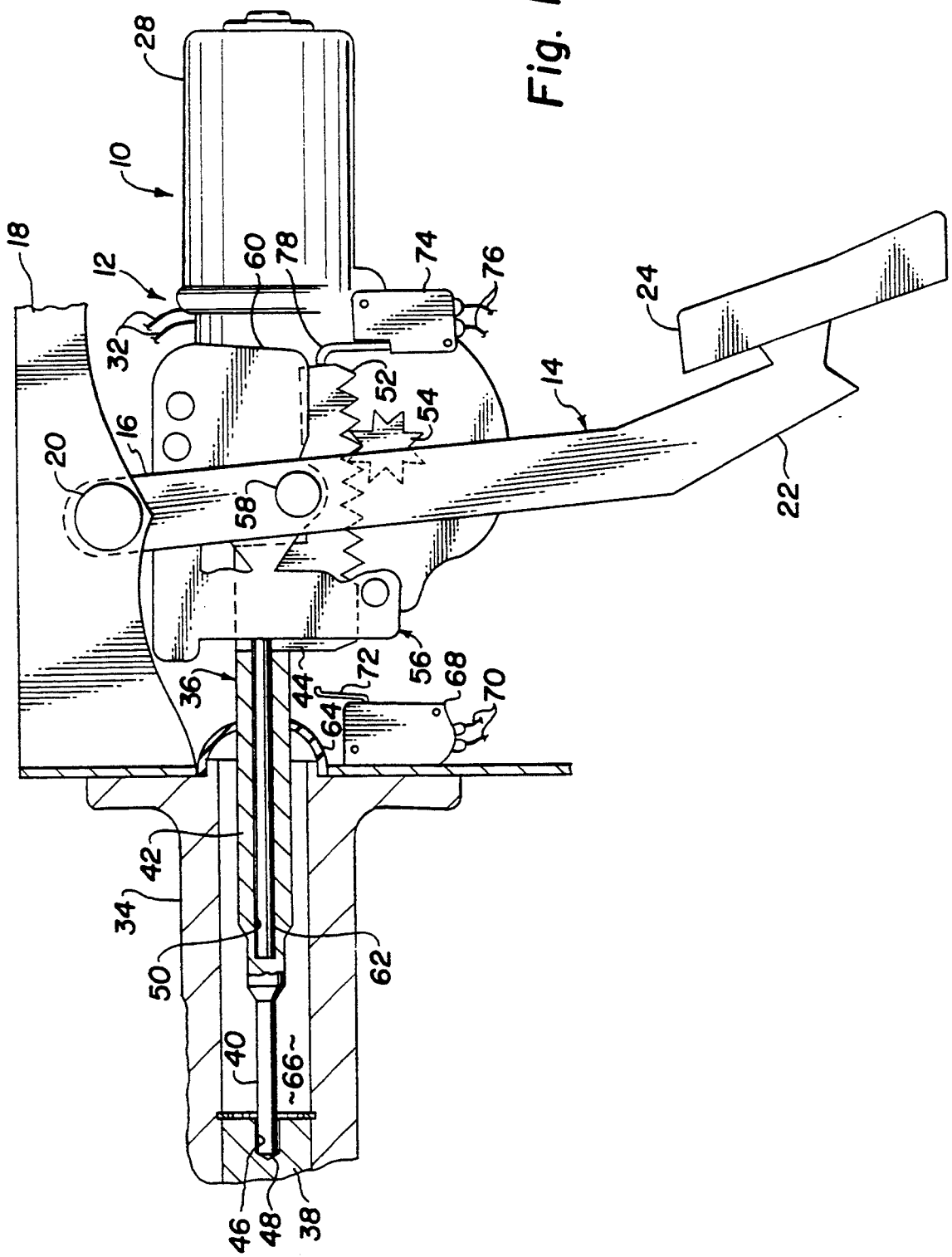
FIG. 1 is an elevational view, partly in cross-section, of a brake override used by the system for preventing the theft of a vehicle constructed in accordance with the present invention illustrated with the system off and the brakes not being applied.
Figure 2:
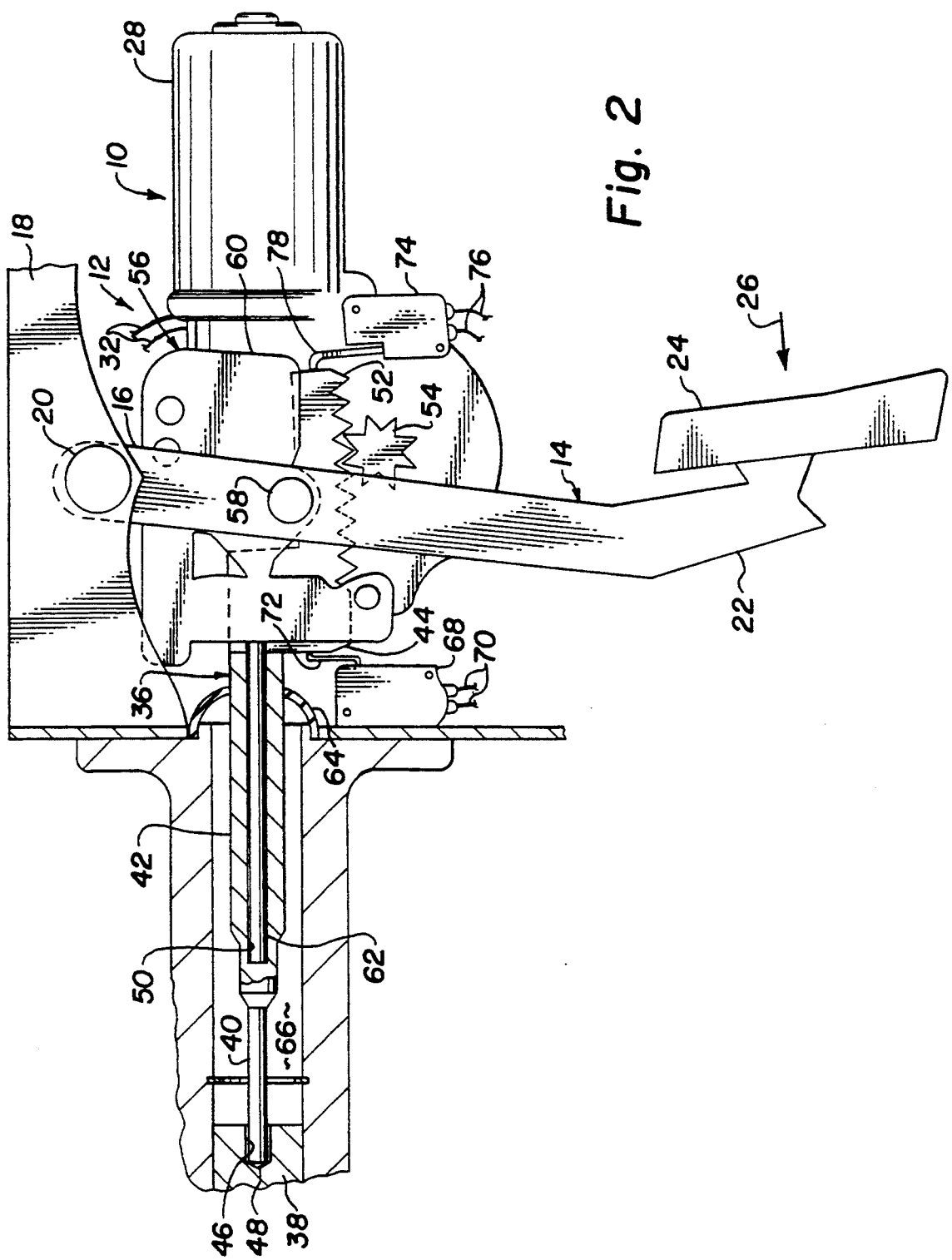
FIG. 2 is an elevational view, partly in cross-section, of a brake override used by the system for preventing the theft of a vehicle constructed in accordance with the present invention illustrated with the system off and the brakes being applied in a conventional operating manner.
Figure 3:
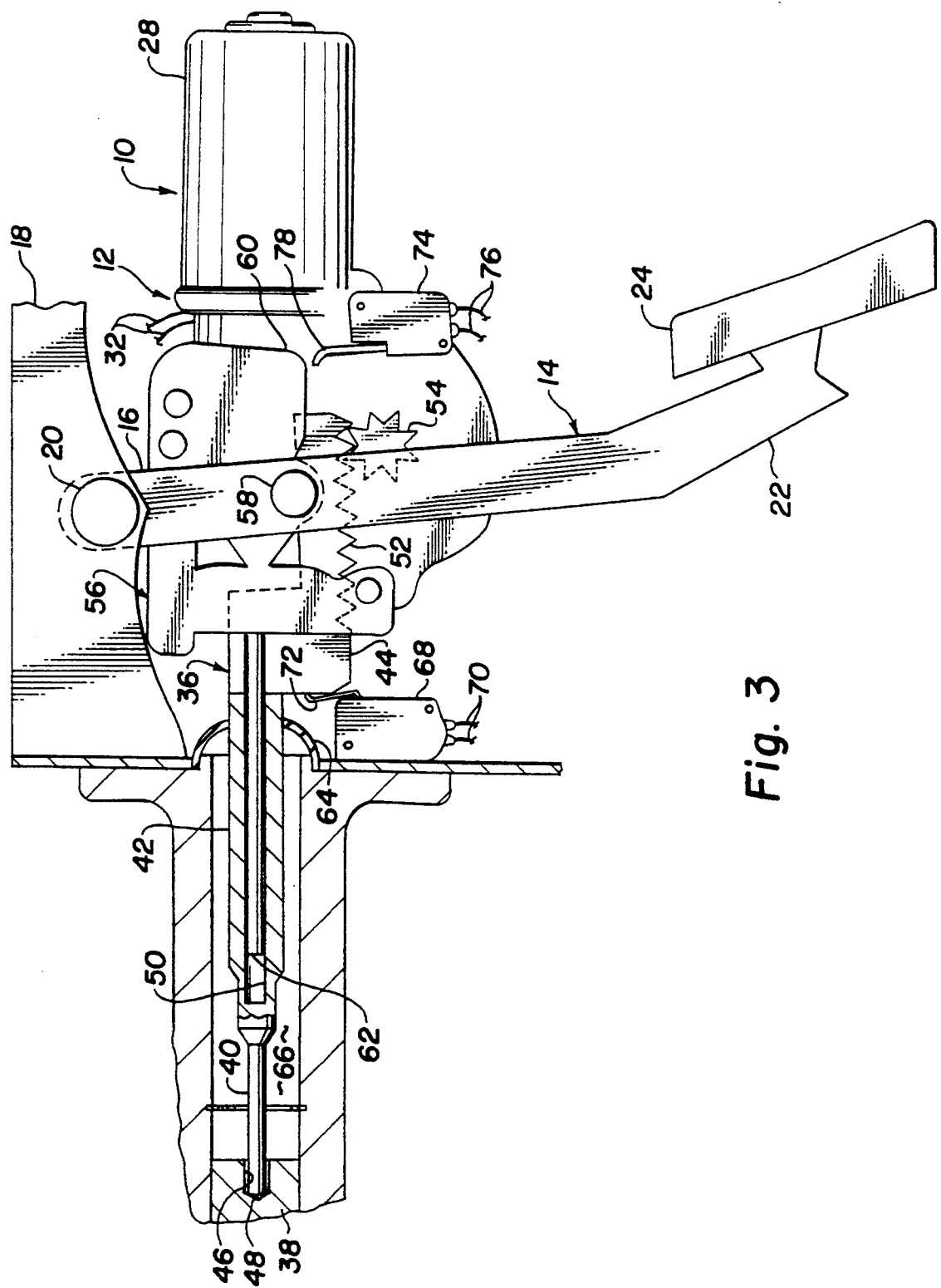
FIG. 3 is an elevational view, partly in cross-section, of a brake override used by the system for preventing the theft of a vehicle constructed in accordance with the present invention illustrated with the system on and the brakes being applied in accordance with the system controls.

Turning now to FIGS. 1-3 of the drawings, there is shown brake override 10 used by system 12 for preventing the theft of a vehicle constructed in accordance with the present invention.

Brake override 10 is connected to a brake pedal 14, which has one end 16 pivotally connected to the frame of vehicle 18 by an extension 20 forming a pin-like connection to the frame of vehicle 18 in a conventional manner and another end 22 mounted to a pedal 24 to be engaged by the foot of a user of vehicle 18. Brake override 10 selectively moves the brakes of vehicle 18 between an engaged and locked position, as shown in FIG. 3, to prevent the vehicle from being moved and a disengaged position, as shown in FIGS. 1 and 2, to allow vehicle 18 to be moved when pedal 24 is located in the position shown in FIG. 1, and to stop vehicle 18 in a normal braking fashion by moving pedal 24 in the direction of arrow 26, as shown in FIG. 2.

A reversible electrical drive motor 28 is used in brake override 10 to move the brakes of vehicle 18 between the engaged and disengaged positions and to lock the brakes of vehicle 18 in the engaged position after the brakes of 18 vehicle have been moved in such engaged position. To prevent bypassing an electrical control system 30, described hereinafter, electrical drive motor 28 is selected to burn out should an electrical current be applied directly to complementary conductors 32, such as an induction neutral motor.

To provide a braking force to a conventional master cylinder 34 of a braking system used in vehicle 18, a force transfer member 36 is mounted in brake override 10 to transfer a force against a movable member 38 in master cylinder 34. Force transfer member 36 has an urging portion 40, an intermediate portion 42, and a force receiving portion 44. Urging portion 40 is a solid rod having a cross-section of sufficient size to be inserted into a cavity 46 in movable member 38 to replace an urging portion of transfer member existing in a conventional braking system and a sufficient length from intermediate portion 42 to outboard end 48 to prevent contact of intermediate portion 42 with movable member 38. Intermediate portion has a cross-section of sufficient size to define a passageway 50. Connected to force receiving portion is a rack gear 52, which complimentarily engages with a pinion gear 54. Pinion gear 54 is connected to a mechanical output shaft of electrical drive motor 28 to move the force transfer member in response to movement of electrical drive motor 28.

A brake urging member 56 is pivotally attached to brake pedal 14 by pin 58. Brake urging member 56 includes a force receiving portion 60 and a force urging portion 62. Force receiving portion 60 is in the form of a generally inverted U-shape disposed around force receiving portion 44 of force transfer member 36 and of such size so as to permit uninterrupted movement of such member relative to force receiving portion 60. Force urging portion 62 has a cross-section of sufficient size to permit movement within passageway 50 of force transfer member 36 and a length of sufficient size to extend to the end of and engage with passageway 50 to urge urging portion 40 of force transfer member 36 into engagement with moveable member 38 of master cylinder 34 to thereby allow braking of vehicle 18 independently of brake override apparatus 10, as shown in FIG. 2.

A rubber sealing member 64 is disposed to prevent the passage of foreign matter into a cavity 66 into master cylinder 34 while permitting force transfer member 36 and force urging member 62 to pass through cavity 66 substantially unimpeded.

A first limit switch 68 is operably connected by complementary conductors 70 to electrical control system 30 for limiting the movement of force transfer member 36 toward master cylinder 34 when force transfer member 36 engages contact 72 provided on switch 68.

A second limit switch 74 is operably connected by complementary conductors 76 to electrical control system 30 for limiting the movement of force transfer member 36 away from master cylinder 34 when force transfer member 36 engages contact 78 provided on switch 74.

Figure 4:
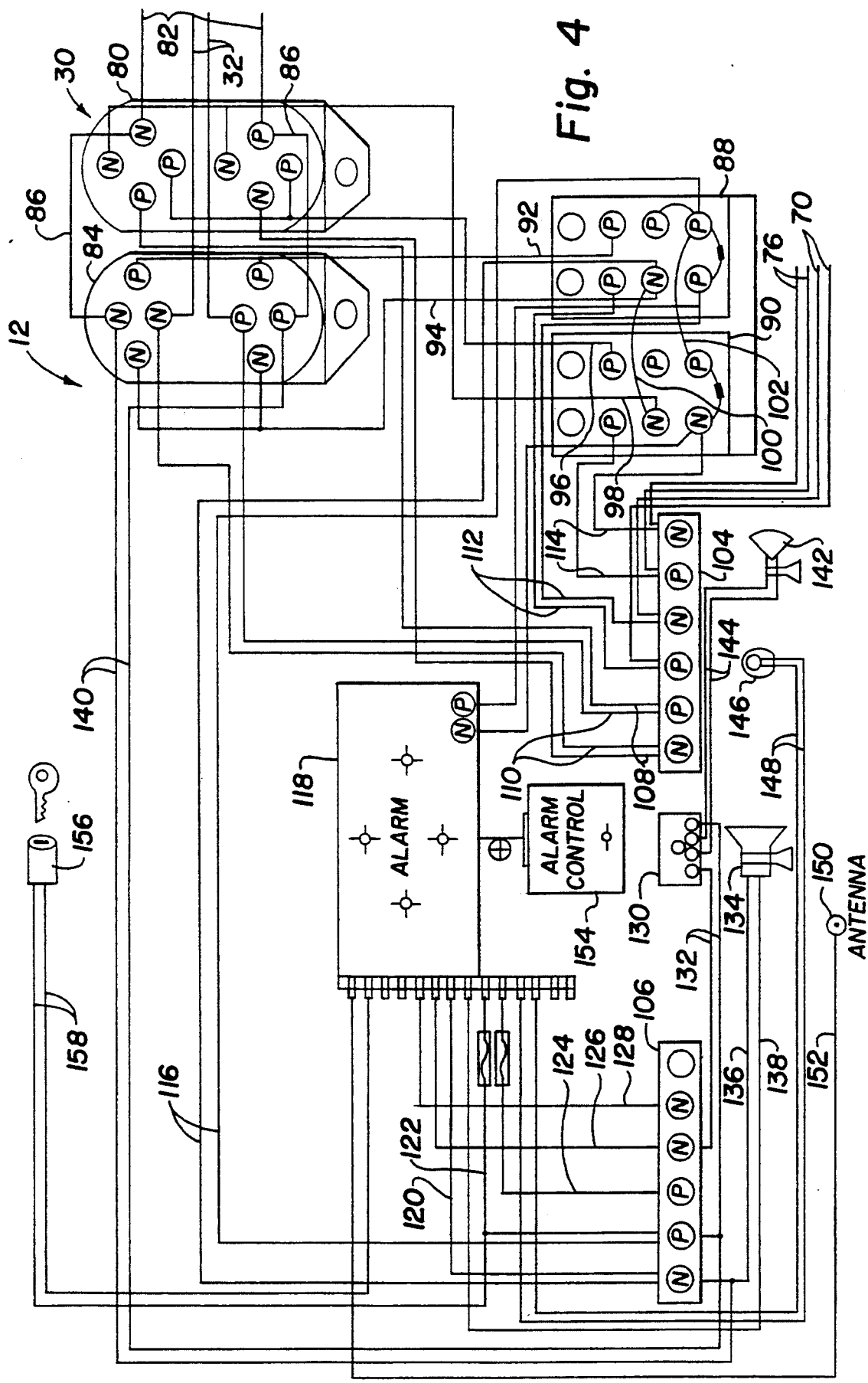
FIG. 4 is a schematic of the electrical system used to control the operations of the system for preventing the theft of a vehicle constructed in accordance with the present invention.

Electrical system 30 to control the operations of brake override apparatus 10 is best seen in FIG. 4.

Electrical system 30 includes a first 12-volt relay 80 connected by a pair of conductors 82 to a conventional battery (not shown) used in vehicle 18; and a second 12-volt relay 84 connected to first relay 80 by a complementary pair of conductors 86 and to electric drive motor 28 by a pair of conductors 32.

Also included in electrical system 30 are first and second 500 microfarad relays 88 and 90, respectively, that operate electric reversible drive motor 28. First 500 microfarad relay 88 is connected to second 12 volt relay 84 by conductors 92 and 94 and second 500 microfarad relay 90 is connected to first 12 volt relay 80 by conductors 96 and 98. First and second 500 microfarad relays 88 and 90 are connected to one another by conductors 100 and 102.

First and second junctions boxes 104 and 106, respectively, are also included in electrical system 30. First junction box 104 is connected to first 12 volt relay 80 by a pair of conductors 108, to second 12 volt relay by a pair of conductors 110, to first limit switch 68 by pair of conductors 70, to second limit switch 74 by pair of conductors 76, to first 500 microfarad relay 88 by pair of conductors 112, and to second 500 microfarad relay 90 by pair of conductors 114. Second junction box 106 is connected to first 500 microfarad relay 88 by a pair of conductors 116; to an alarm system 118, such as that made by Excalibur with Model No. 700, by conductors 120, 122, 124, 126 and 128; to a switch 130 by a pair of conductors 132; to a horn 134 mounted on vehicle 18 by a conductor 136, horn 134 being connected to alarm system 118 by conductor 138; and to second 12 volt relay 84 by a pair of conductors 140.

Switch 130 is also connected to tail lights 142 by a pair of conductors 144 so as to inactivate the lights indicating when the brakes are engaged.

A light 146 is also connected to alarm system 118 by a pair of conductors 148. Light 146 is positioned to be visible to a user of the system to indicate when the system has become activated.

An antenna 150 is connected to alarm system 118 by a conductor 152 so that upon receiving an appropriately provided radio signal as determined by alarm control 154 activates alarm system 118 and brake override apparatus 10.

An ignition switch 156 is wired into alarm system 118 by a pair of conductors 158.

In operation, a user gets out of vehicle 18 and transmits a radio signal to control 154 by depressing a button on a conventional alarm activating device. Upon brake setting activation, reversible electric motor 28 in brake override apparatus 10 begins rotating pinion gear 54 in a counterclockwise direction, as viewed in FIGS. 1-3. Beginning from the position shown in FIG. 1, rack gear 52 is moved toward the left to urge urging portion 40 of force transfer member 36 into engagement with movable member 38 in brake master cylinder 34. Movable member 38 is moved to the left until force receiving portion 44 of force transfer member 36 engages contact 72 on first limit switch 68 to terminate electrical power through conductors 32 to motor 28, as shown in FIG. 3. Since force urging portion 62 of brake pedal urging member 56 is allowed to move independently within passageway 50 of force transfer member 36, brake pedal 24 may remain stationary throughout this action while setting the brakes on each wheel in the braking system of vehicle 18, typically four wheels are on a conventional automobile or pick-up truck, to prevent the vehicle from being moved without inactivating the brake override apparatus. Further, since electric motor 28 is selected to not be moved without the appropriate electrical power being supplied through conductors 32 and to burn out should an inappropriate electrical power be directly applied in an attempt to bypass electrical system 30, motor 28 must be operated through electrical control system 30 to inactivate brake override system 10 to thereby un-set the brakes on vehicle 18. Further, since electrical control system 30 uses a switch 130 to inactivate tail lights 142 on vehicle 18, the battery supplying electrical power through conductors 82 will not be drained when the brakes are engaged by brake override system 10.

When an authorized user desires to use vehicle 18, the user transmits a radio signal to control 154 by depressing a button on the conventional alarm activating device. Upon activation, reversible electric motor 28 in brake override apparatus 10 begins rotating pinion gear 54 in a clockwise direction, as viewed in FIGS. 1-3. Beginning from the position shown in FIG. 3, rack gear 52 is moved toward the right to urge urging portion 40 of force transfer member 36 away from engagement with movable member 38 in brake master cylinder 34. Force urging member 36 is moved to the right until force receiving portion 44 of force transfer member 36 engages contact 78 on second limit switch 74 to terminate electrical power through conductors 32 to motor 28, which allows movable member 38 to be moved toward the by the pressure from the hydraulic fluid in the braking system on vehicle 18, as shown in FIG. 1.

After a legitimate user has inactivated electric motor 28 by using electrical control system 30, the braking system on vehicle 18 is allowed to operate by the user using his foot to urge pedal 24 and apply the brakes in a conventional manner, as shown in FIG. 2.

I claim:

1. An anti-theft system for preventing the theft of a vehicle having brakes used for stopping the vehicle, comprising: brake override means connected to the vehicle for selectively moving the brakes of the vehicle between an engaged and locked position to prevent the vehicle from being moved and a disengaged position to allow the vehicle to be moved; remote controlled activating means mounted on the vehicle for activating said brake override means to move the brakes between the engaged and locked position and the disengaged position; remote controlling means provided exteriorly of the vehicle for activating said remote controlled activating means to prevent movement of the vehicle when an authorized user so desires and to allow movement of the vehicle when the authorized user so desires; an electrical system to control the operations of said brake override means; and an electrical drive motor means operably connected to said electrical system for moving the brakes between the engaged and disengaged positions and for locking the brakes of the vehicle in the engaged position after the brakes of the vehicle have been moved to the engaged position.

2. The anti-theft system set forth in claim 1, further comprising: a switch disposed within said electrical system to inactivate a light indicating when the brakes are in the engaged and locked position.

3. The anti-theft system set forth in claim 1, further comprising: said electrical drive motor means being selected to burn out should an electrical current be directly applied in an attempt to bypass said electrical system.

4. The anti-theft system set forth in claim 1, further comprising: a force transfer member to provide a braking force to a master cylinder of a braking system used in the vehicle; a rack gear connected to said force transfer member; and a pinion gear connected to a mechanical output shaft of said electrical drive motor means and disposed to complimentarily engage the rack gear to move the force transfer member in response to movement of said electrical drive motor means.

5. The anti-theft system set forth in claim 4, further comprising: a first limit switch operably connected to the electrical system for limiting the movement of the transfer member toward the master cylinder; and a second limit switch operably connected to the electrical system for limiting the movement of the transfer member away from the master cylinder.

6. The anti-theft system set forth in claim 1, further comprising: an electronic alarm system mounted on the vehicle for providing an alarm when an attempt is made to move the vehicle without inactivating said brake override means.

7. The anti-theft system set forth in claim 1, further comprising: a switch disposed within said electrical system to inactivate a light indicating when the brakes are in the engaged and locked position; said electrical drive motor means being selected to burn out should an electrical current be directly applied in an attempt to bypass said electrical system; a force transfer member to provide a braking force to a master cylinder of a braking system used in the vehicle; a rack gear connected to said force transfer member; a pinion gear connected to a mechanical output shaft of said electrical drive motor means and disposed to complimentarily engage the rack gear to move the force transfer member in response to movement of said electrical drive motor means; a first limit switch operably connected to the electrical system for limiting the movement of the transfer member toward the master cylinder; a second limit switch operably connected to the electrical system for limiting the movement of the transfer member away from the master cylinder; and an electronic alarm system mounted on the vehicle for providing an alarm when an attempt is made to move the vehicle before moving the brakes to the disengaged position.

8. An anti-theft system for preventing the theft of a vehicle having brakes used in stopping the vehicle, comprising: an alarm means adapted to be mounted on the vehicle for providing an alarm when the vehicle is moved, said alarm means adapted to be switched between an activated position when the vehicle is not being moved and an inactivated position when the vehicle is moving, said alarm means including an electronic control system; and brake override means adapted to be connected to said alarm means and to the vehicle for locking the brakes of the vehicle in an engaged position when said alarm means is activated, said brake override means including an electrical system compatible with the electronic control system and a switch disposed within the electrical system of said brake override means to inactivate a light indicating when the brakes are engaged, an electrical drive motor for moving the brakes between the engaged and disengaged positions and for locking the brakes of the vehicle in the engaged position when said alarm means is activated, the electrical drive motor being adapted to burn out should an electrical current be directly applied so as to bypass the electronic control system of said alarm means.

9. The anti-theft system set forth in claim 8, further comprising: said brake override means further including the electrical motor being an induction neutral motor.

10. The anti-theft system set forth in claim 8, further comprising: said brake override means further including a force transfer member to provide a braking force to a master cylinder of a braking system used in the vehicle, a rack gear connected to the force transfer member, and a pinion gear connected to a mechanical output shaft of the electrical drive motor and disposed to complimentarily engage the rack gear and move the force transfer member in response to movement of the electrical drive motor.

11. The anti-theft system set forth in claim 10, further comprising: said brake override means further including a first limit switch operably connected to the electrical system for limiting the movement of the force transfer member toward the master cylinder and a second limit switch operably connected to the electrical system for limiting the movement of the transfer member away from the master cylinder.

12. The anti-theft system set forth in claim 11, further comprising: said brake override means further including the force transfer member defining a passageway, and an urging member having a portion disposed within the passageway of the force transfer member and another portion connected to a brake pedal on the vehicle to urge the transfer member toward and away from the master cylinder in response to movement of the brake pedal.

13. The anti-theft system set forth in claim 12, further comprising: said brake override means further including the urging member connected to the brake pedal being of such size and strength to urge the force transfer member toward and away from the master cylinder in response to movement of the brake pedal while being sufficiently small to allow movement of the force transfer member toward and away from the master cylinder in response to the force provided by the electrical drive motor.

14. The anti-theft system set forth in claim 13, further comprising: said brake override means further including the electrical motor being an induction neutral motor.

15. The anti-theft system set forth in claim 14, further comprising: said alarm means further including the light being activated to indicate when said alarm means has been activated.

16. The anti-theft system set forth in claim 15, further comprising: said alarm means further including means to activate a horn and lights on the vehicle when the vehicle is disturbed after said alarm means has been activated.

17. The anti-theft system set forth in claim 8, further comprising: said alarm means further including a light to indicate when said alarm means has been activated.

18. The anti-theft system set forth in claim 8, further comprising: said alarm means further including means to activate a horn and lights on the vehicle when the vehicle is disturbed after said alarm means has been activated.

* * * * *